United States Patent [19]

Carle

[11] 4,182,680
[45] Jan. 8, 1980

[54] DEVICE FOR FILTRATION UNDER PRESSURE OF SOLID PARTICLES CONTAINED IN LIQUIDS

[75] Inventor: Jean-Claude A. Carle, Viry Noureuil, France

[73] Assignee: Societe Anonyme des Fonderies et Ateliers L. CHOQUENET, Chauny, France

[21] Appl. No.: 916,550

[22] Filed: Jun. 19, 1978

[30] Foreign Application Priority Data

Jun. 22, 1977 [FR] France .................. 77 19110
May 25, 1978 [FR] France .................. 78 15532

[51] Int. Cl.² ............................................ B01D 33/08
[52] U.S. Cl. ...................................... 210/386; 210/68; 210/391; 210/404
[58] Field of Search .................... 210/68, 345–347, 210/391, 393, 396, 400–405, 455, 386; 100/112, 120; 209/307; 162/348, 351

[56] References Cited

U.S. PATENT DOCUMENTS

| | | | |
|---|---|---|---|
| 2,963,158 | 12/1960 | Jung | 210/386 X |
| 3,375,932 | 4/1968 | Ishigaki | 210/390 |
| 3,485,378 | 12/1969 | Regel | 210/403 X |
| 3,564,631 | 2/1971 | Burling | 210/400 X |
| 3,767,052 | 10/1973 | Shibasaki | 210/400 X |
| 3,897,341 | 7/1975 | Ozawa | 210/386 |

*Primary Examiner*—William A. Cuchlinski, Jr.

[57] ABSTRACT

The invention concerns a device for filtration under pressure making use of the combined actions of a looped band, a filter cloth and a distributing drum on a portion of the periphery of said drum which is covered by a compartmented region of said band, with a sealing effect provided by application of an external pressure upon said band. The devices is organized to perform filtration while the drum, a sequence of compartmented elements and filter cloth are stationary, while the filter is caused to open by the placing in rotation and rotary travel of at least said drum and said filter cloth. Each compartment may be provided with a grooved bottom for collection of the filtered liquid, passing through a corresponding filter cloth, with the corresponding drum surface being itself provided with grooves covered by a second filter cloth driven by said drum and traversed by incoming liquid to be filtered. The invention provides an improvement in filtration efficiency and a simplification of filter construction.

16 Claims, 7 Drawing Figures

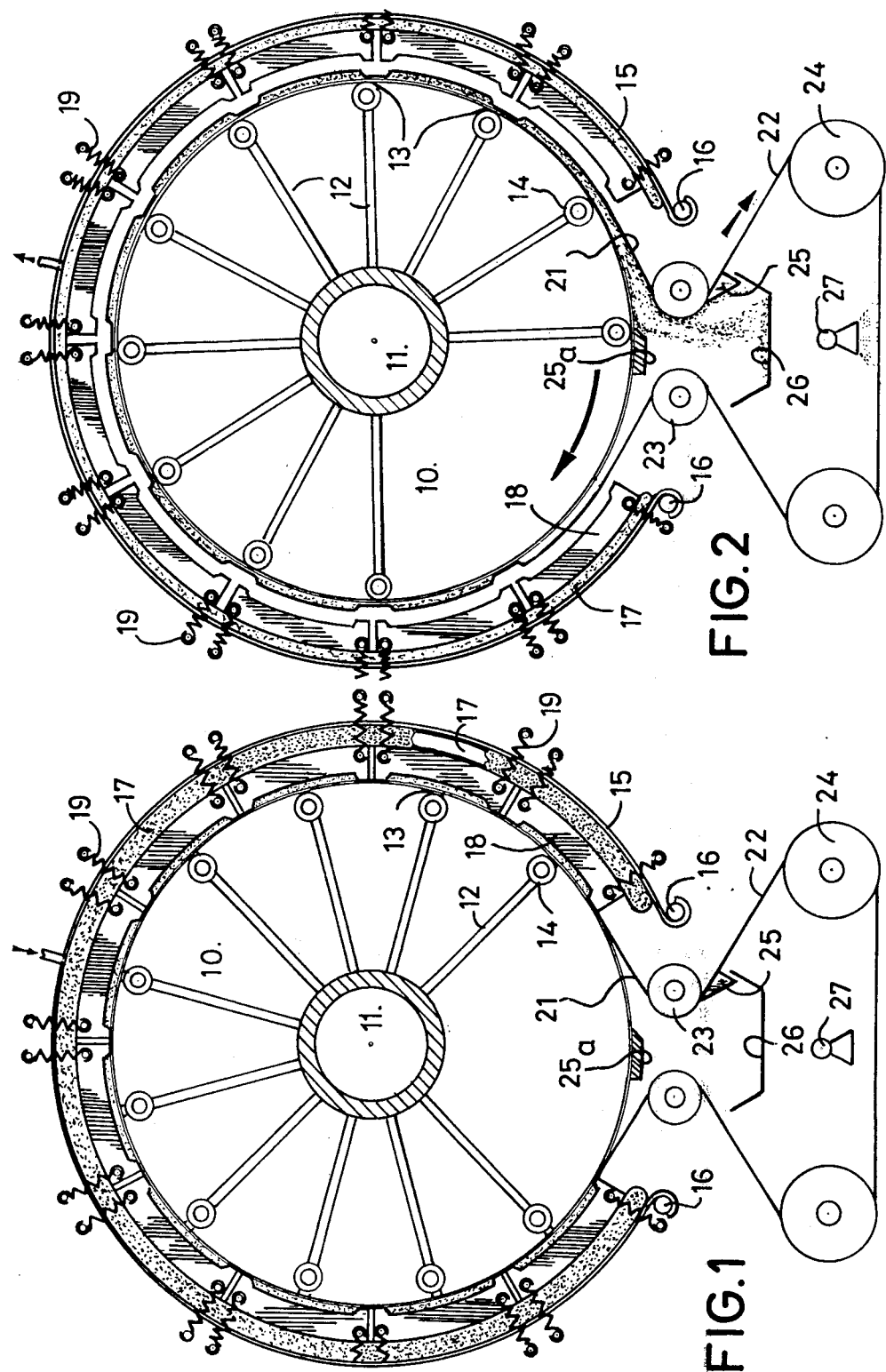

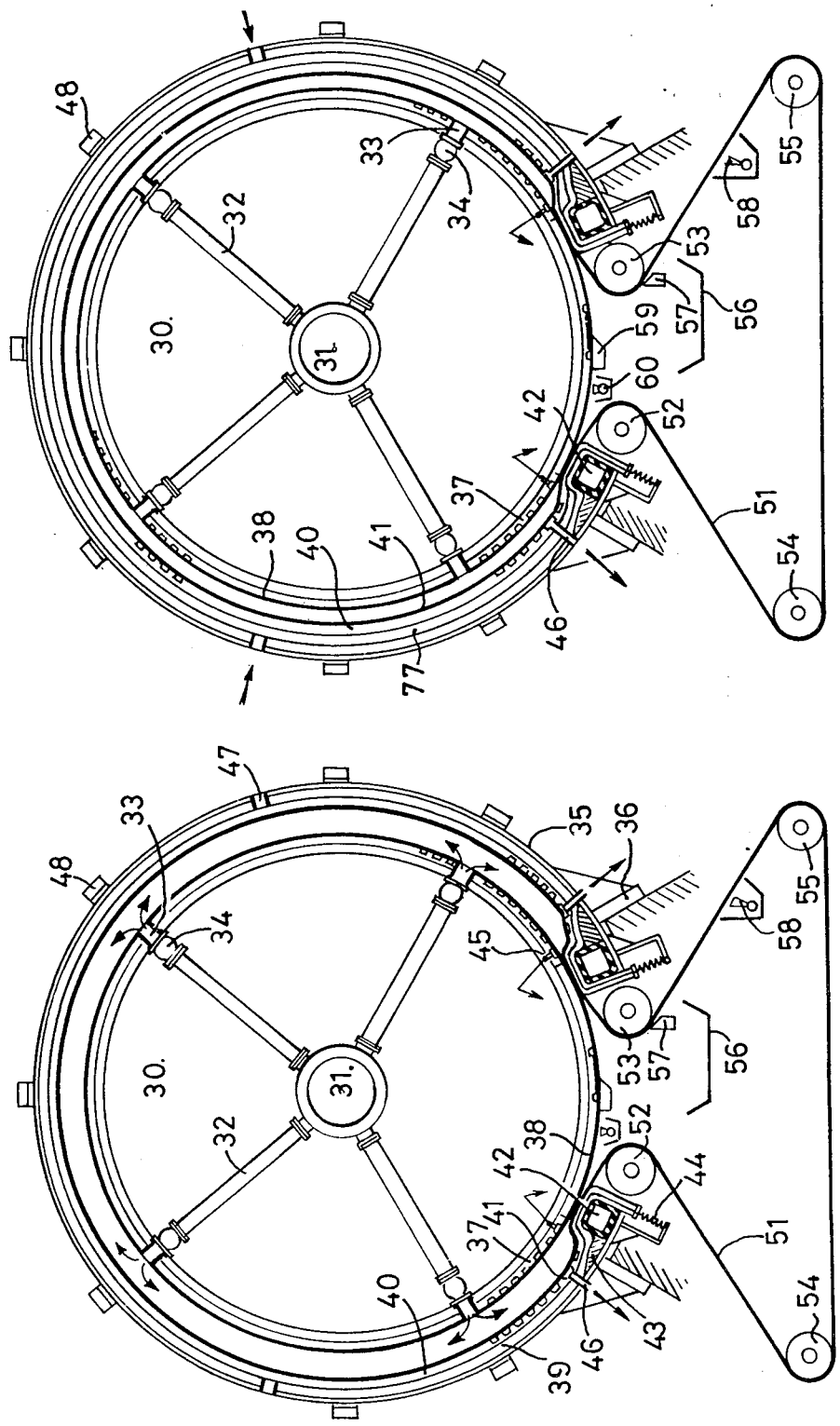

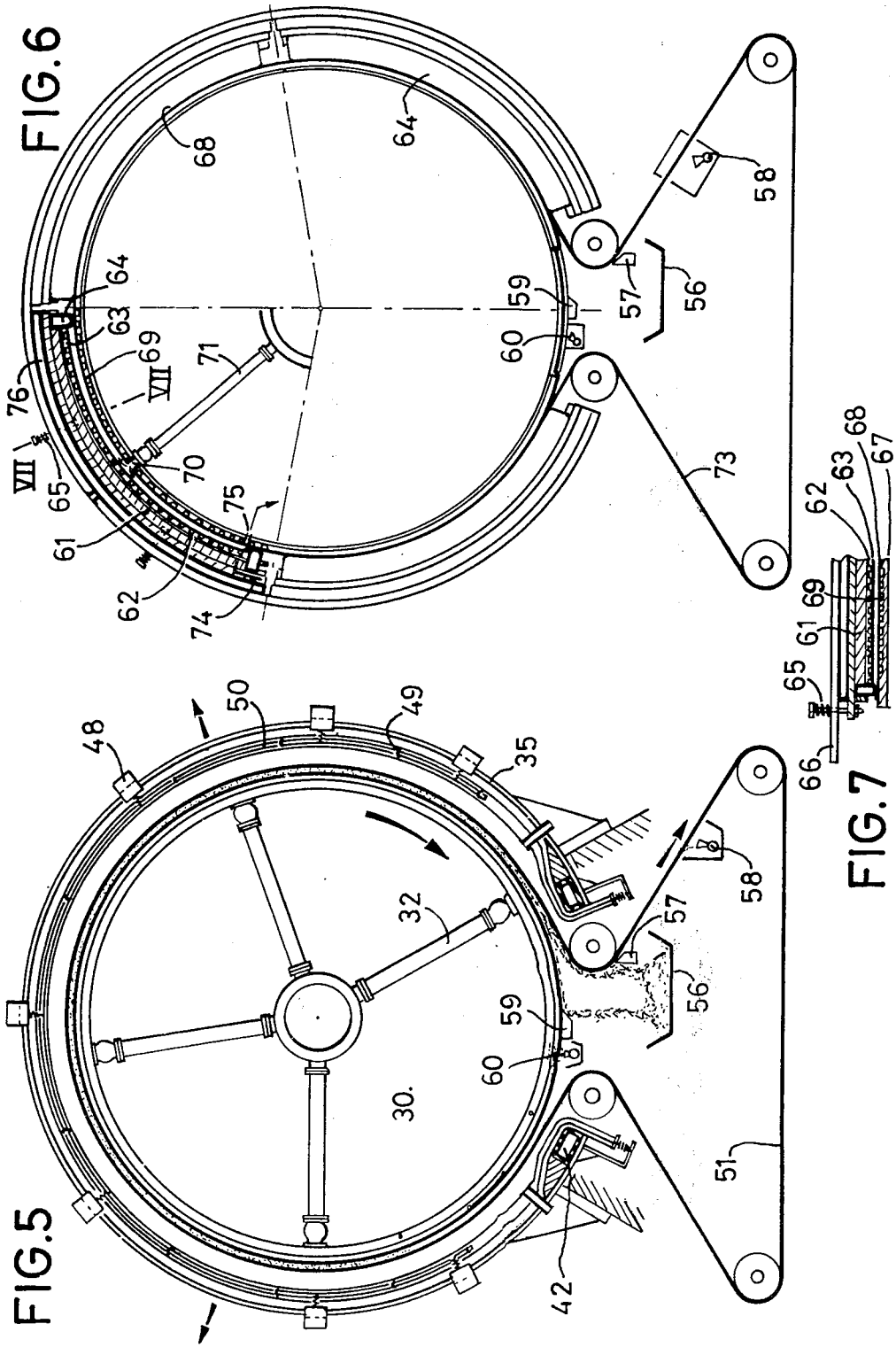

DEVICE FOR FILTRATION UNDER PRESSURE OF SOLID PARTICLES CONTAINED IN LIQUIDS

The technical province of the invention is that of filtration.

A continuous filtration device is already known through patent application Ser. No. 656,537, filed on Feb. 9, 1976, and particularly intended for the separation of a liquid from a solid substance with which it is charged, including a rotary drum sector surrounded by a filter band and a filter cloth which thus partially envelope said drum, otherwise following a looped path remote from said drum, with admission of the charged liquid taking place under pressure.

In this known device, the endless filter band contains non-filtering compartments constituting filtration chambers, locally applied with the filter cloth band against the feed drum, while travelling in a movement synchronized with said drum under the effort of an external pressure which creates a tight seal by the cell edges against said cloth and said drum, this latter presenting a continuous, smooth and cylindrical supporting surface.

In such a device, the charged liquid feed is continuous during drum rotation and during the corresponding travel of the compartmented band and filter cloth. The development of a watertight contact by this cloth and this band against the drum's cylindrical surface requires a substantial pressure leading to the exertion of a high torque for driving the band, cloth and drum assembly into low-speed rotation. The mechanical drive parts must be correspondingly dimensioned and, although operation does not require a high energy consumption, machine construction is expensive. p The purpose of the present invention is to remedy such disadvantages.

To this end, by replacing the rotary operation of the drum and continuous travel of the compartmented band and filter cloth, respectively, by an operation involving a rotation alternating with periods of immobility, pressure is applied to apply the band and cloth against the drum, with charged liquid admission and filtered liquid discharge during the periods of immobility, while travel is resumed upon release of the application pressure and interruption of (at least) the flow of charged liquid.

In greater detail, the device pursuant to the invention includes the combination of: a drum provided with radial inlet channels for the charged liquid to be filtered originating at a tight control valve on the drum's rotary shaft and terminating a openings in the drum surface, in the proximity of which valves are installed; a filter cloth enveloping an initial segment of drum and spaced from a second, complementary segment as it follows a looped path passing over countershafts; and a chain of compartmented elements surrounding said initial drum segment, which segment is also enveloped by means for tight application of said filter cloth and said compartmented elements against said drum, which means are placed in action during the intervals of open-valve admission of the charged liquid while the drum, chain and cloth are immobile, and released upon the closing of said valves while at least the drum and cloth are set in motion causing them to pass by at least a station for scraping off the solid residue of filtrate cake.

The chain of compartmented elements, also separated from the periphery of the drum by a looped path, may also be caused to advance along a different routing from that of the filter cloth within the same path. In a particularly simple and advantageous form of construction, however, in which travel by the compartmented band is no longer necessary, only the rotary capability of the drum and the capability for intermittent travel by the filter cloth are maintained, while the chain of compartmented elements is limited to radial motion at said initial segment, with each element offering only an individual capability of radial travel toward and away from said drum and its enveloping filter cloth. In this case, the cloth acts as the support for cake formation during filtration, and extracts said cakes from the press upon release of the pressure applied to the drum, permitting their evacuation along the looping path of said cloth outside of its passage between the drum and the compartmented band, while said cloth may be regenerated by washing of one or both of its surfaces following a scraping process which might simultaneously be applied also to the drum, the scraping devices carrying the detached solids to discharge components. A scraping system may be installed on the surface of said second segment of the drum to convey detached solids to discharge components.

The valves are preferably as close as possible to the outlets of said radial channels in the lateral surface of the drum.

In an advantageous form of construction, the means for tight application of the chain of compartmented elements and the filter cloth against the drum are formed by the combination of an outer hoop, held in place around the initial segment by stationary fasteners, and an inflatable inner envelope between hoop and chain.

The described arrangements lead to very simple mechanisms, inexpensive to construct and requiring very low drive efforts. They therefore enhance the efficiency of the filtration devices in question. In point of fact, drum rotation and filter cloth travel may be effected at low torque and relatively high speed, as both drum and cloth are then free of any pressure against seals. The rhythm of operations for charged-liquid admission and cake formation may then be substantially accelerated, thereby increasing filtration efficiency, even if the deposit of solids during an individual operation is diminished.

In order to further enhance the filtration efficiency for the device in question, each compartment may be provided with a grooved bottom for collection of the filtered liquid which traverses a corresponding filter cloth, the corresponding surface of the drum itself being provided with grooves, covered with a second filter cloth fastened to and driven by said drum, and traversed by the incoming liquid to be filtered. In this manner, the filtering surface is doubled, as is the thickness of the deposit of solids, within the same operating interval.

The sealing edge of each compartment may advantageously be formed by an inflatable tubular seal or ring.

The complete set of compartments preferably constitutes a chain which surrounds the drum's first active filtering segment, each chain element having its individual sealing ring and centrifugal return components, while being backed by an inflatable bladder inserted within an outer supporting hoop.

The internally-grooved compartmented chain might be formed of belts in a flexible, elastic substance having smooth framing strips, with at least one such belt passing around the drum and in turn enveloped by a second belt, with both inner and outer belts associated with a corresponding filter cloth. In this case, the outer belt may be formed of a pair of belts: an inner belt with grooves on one surface; and an outer belt with two smooth surfaces and with orifices for inflation of the space provided between said belts for cake scraping and forming an inflatable chamber. The drum itself may be lined with a belt having a grooved outer surface and covered with a filter cloth, remaining fixed to said drum. In this form of construction, it is advantageous to form a single compartment, with inflatable tubular peripheral seal, around the initial segment of the drum. This seal presents a toroidal lateral configuration with two rectilinear traverses at the ends of the sector. This makes it possible to simplify the construction of the control valves and inlet valves for the charged liquid to be filtered.

It is also advantageous to provide such a filtration device with orifices for admission between the filter cloth of cake rinsing liquid and cake drying gases, if necessary, as well as arrangements for cloth scraping and wash regeneration, both on the drum (for the cloth fastened to said drum) and on the looped path (in the case of the filter cloth following said path and separated from the drum surface).

Finally, in the form of construction in which elastic belts are provided, the components for centrifugal return of said belts upon filter opening are preferably connected to said belts by marginal reinforcements. At least one of the belts is provided with said fastening reinforcements.

These arrangements yield numerous advantages, including: creation of a larger filtering surface; doubling of efficiency, as a doubly-thick cake may be obtained; extreme dryness of the cake, which may be washed and dried; and all of the above with the possibility of a decreased operating pressure, permitting further lightening of filter construction.

The following description, together with the appended drawings, which are are given as examples and are not limitative in scope, shall provide a clear understanding of the invention's practical application.

FIG. 1 shows a diametral cross-section of a filtration device in operating position.

FIG. 2 shows the device in its opened position, with discharge of solid cakes retained on the filter cloth.

FIGS. 3 to 5 show another form of construction of a filtration device in the operating phases corresponding respectively to filtration, drainage and discharge of the solid residue after filtration.

FIG. 6 shows a constructional variant of the compartmented chain.

FIG. 7 is a partial cross-section along line VII—VII of FIG. 6.

The device shown in FIGS. 1 and 2 includes, as in the prior patent application mentioned in the first paragraphs, a drum 10 mounted on a hollow shaft 11 communicating with a source of charged liquid by means of a rotating tight control valve, the source and control not being shown. This hollow shaft is the origin for uniformly-spaced radial tubes 12 which terminate at openings 13 on the drum's smooth, cylindrical surface; in the immediate proximity of these openings, each tube is provided with a controlled check valve 14, the same type as those described in the abovementioned patent application, which, together with their control device, are reduced to schematic symbols on the drawing.

The periphery of this drum is surrounded by a hoop 15 formed by an enveloping band, suitably retained at its extremities on anchor points 16. An inflatable envelope 17, itself enveloping a chain of filter elements 18, is inserted inside this hoop 15.

Each filter element 18, whose inner surface describes a compartment surrounded by a rim, is held in place by elastic fastenings 19 permitting the element to follow a centrifugal path away from drum 10 and a centripetal path toward drum 10, under the effort of envelope 17 when this envelope is pneumatically or hydraulically inflated within hoop 15. The outer surface of each element 18 is smooth, while the inner surface, provided with a filter compartment, is in lateral communication with a filtered-liquid discharge tube (not shown) which may be analogous in arrangement to those found in the abovementioned known constructions.

A filter cloth band 21 passes inside the set of compartmented elements 18 and outside of drum 10 to form a closed loop. As the set of compartmented filter elements 18 does not occupy an angular segment at the bottom of drum 10, band 21 moves away from the drum at that point along an outer path 22, passing over countershafts 23 and pulleys 24, between which are placed a filter-cloth scraping station 25 above a solid filtrate collector 26 and a washing station 27. The scraping and washing stations may be equipped with scrapers and spraybars acting upon both surfaces of said cloth, if necessary. Another scraping station 25a is also situated in this segment, above collector 26 cooperable with the surface of drum 10.

Operation of this device is as follows:

When filtration is performed, drum 10 and cloth band 21 are immobile; envelope 17 inside hoop 15 is inflated, thereby sealing the cloth against the drum and the edges of the compartments of elements 18 against said cloth, with fastenings 19 extended. The charged liquid is admitted through the hollow shaft 11 and radial tubes 12, while valves 14 are open at the outlet orifices 13 opposite from each compartment; a cake forms at that point between drum and cloth.

At the end of filtration, with the charged liquid input interrupted by valves 14, envelope 17 is deflated and fastenings 19 separate elements 18 from the drum.

The drum, carrying the filter cloth, is then placed in rotation. As the moving elements are then free, this movement offers only little passive resistance. This resistance includes only bearing friction, the action of filter-cloth scraper 25 and scraper 25a on the periphery of drum 10, both of which are above the solids discharge collector 26; to these are added frictional resistance in the rotary seal (if present) between the fixed feed and the hollow shaft 11, as the flexure of the filter cloth offers negligible resistance.

Under these conditions, it may be observed that the effort required to rotate the drum and filter cloth during the filter-opening phase is very low, and that operations for discharge of solid residue, reconditioning of the filter cloth and repositioning of filter elements may be very rapid.

Although operation of these filtration means is not continuous for filtration and discharge of solid filtrate—as discharge of solids takes place in intervals separate from those during which charged liquid is admitted, filtered liquid is discharged and separated solids accumulate in compartments on the filter cloth—these operations may be performed at high repetitive rates, contributing to an acceleration of the filtration process and an increase in its efficiency.

In fact, the filtrate cakes or their remnants are discharged at the level of scraper 25; remnants on the drum are discharged at the level of scraper 25a; finally, the cloth is cleaned and fully restored to its filtering quality at the level of spray(s) effected by nozzle(s) 27.

Moreover, there is no need to manipulate moving parts having large travel distances, so that the mechanism for this entire unit remains quite simple.

It goes without saying that modifications may be made without departing from the framework of the invention. Thus the set of elements 18, instead of being stationary, may also take the form of a moving chain, as effected in known arrangements, following a looped path outside of the immediate vicinity of the drum, in order to be subjected to cleaning operations with each period of operation, assimilable to a filter opening, in which case it is not fitted with elastic fasteners.

In the form of construction shown in FIGS. 3 to 5, the filtration device includes a drum 30 mounted on a hollow shaft 31, itself mounted on a bearing-equipped frame not shown in detail. This smooth-surface drum 30 is provided with uniformly-spaced radial tubes 32, leading from hollow shaft 32 to openings 33 in the abovementioned smooth lateral surface. The hollow shaft is fitted with a tight union connecting it to a source of solids-charged liquid to be filtered at a desired pressure. Controlled check valves 34 are installed in the immediate proximity of these openings 33. These valves and their control devices are neither described nor represented here in detail.

On the periphery of this drum, the abovementioned frame supports a surrounding hoop 35, suitably held in place by end anchor points 36.

Drum 30 is surrounded by a rubber belt 37 having a smooth inner surface and a grooved outer surface. Only one part of these grooves have been represented. The belt edges on the grooved surface are free of grooves, in order to permit development of a tight seal against the smooth surfaces thus provided. A filter cloth 38 envelopes and extends beyond the grooved area to cover the smooth marginal areas of this rubber belt 37. This cloth 38 is perforated at each outlet 33, and is tightly joined to the edge of each outlet.

A rubber belt 39 with two smooth surfaces is placed inside hoop 35. This belt 39 is backed by a second belt 40 with a smooth outer surface and a grooved inner surface 41. This surface 41 is provided with discharge channels 46 for filtrate and is bordered by smooth strips opposite from those on drum belt 37. An inflatable tubular seal 42, whose two rectilinear segments alone are shown in cross-section in the drawings, is installed beneath these edges of the two belts 39 and 40. These segments are connected to edge seals forming circular arcs and mating with the cylindrical sector in which filtration takes place. A flexible wedge 43 holds seal 42 in place at each end of hoop 35. The portion of the two belts 39 and 40 extending beyond seal 42 is tensioned by a system of springs 44 ensuring correct fitting around the seal. Seal 42 establishes a single filter compartment extending around the entire cylindrical segment.

The system of outer grooves of belt 37 is provided with discharge channels 45 whose seal is maintained as they slide past the opposite belt 39. This outer belt 39 is provided with fittings 47 for inflation of space 77 between the two belts 39 and 40.

The hoop or frame is fitted with fasteners 48, uniformly spaced along the periphery of the filtration segment. The fasteners hold springs 49 (FIG. 5) which are stapled to marginal reinforcements 50 anchored on the edge of belt 40, so that the force by said springs will tend to separate said belts 39 and 40 from drum 30 when the filter is opened for cake extraction (with tubular seal 42 and space 77 between belts 39 and 40 deflated).

As explained above, an outer filter cloth 51, associated with the grooves 41 of belt 40, surrounds the drum at the filtration segment and, inside the space between the two ends of seal 42, passes over narrowly-spaced rolls 52 and 53, and then over widely-spaced rolls 54 and 55, in order to make room for a solids discharge collector 56, as well as for scraping systems 57 and spray systems 58 for filter cloth 51, and scraper system 59 and spray system 60 for drum filter cloth 38.

This unit operates in the following manner:

With both drum 30 and outer cloth 51 immobile, seal 42 with transverse segments and toroidal lateral sections is inflated, thereby sealing the peripheries of belts 39 and 40 against belt 37. The charged filtered liquid is admitted through openings 33 between filter cloths 38 and 51, and the filtered liquid drains in the grooves in said belts and through channels 45 and 46.

The solids retained between said filter cloths form a cake; upon interruption of charged liquid admission through the valves on tubes 32, compressed air is injected between belts 39 and 40 through orifices 47 to form space 77 therebetween. The result is a high degree of drainage due to compression of the liquid between filter cloths 38 and 51 and their corresponding belts 37 and 40 (FIG. 4). It is also possible to then inject a cake washing liquid through channels 46.

This washing may also be followed by a drying operation by gas admission (e.g., compressed air) through the same inlet, with or without prior drainage.

These operations are followed by a decompression of space 77 between belts 39 and 40, and deflation of seal 42 which, by means of springs 49, opens the space in which the cake has been formed and permits the simultaneous placing in rotation of drum 30 and outer cloth 51. This cake is scraped at 59 and at 57, and the filter cloths are regenerated by washing at 58 and 60. Upon completion of one revolution of the drum, the preceding cycle may be repeated for a fresh filtering operation. These operations may be rapidly repeated.

The chief advantages of this procedure are as follows:

filtration at both surfaces of the cake, leading to doubled efficiency, as a cake of double thickness is formed within an unchanged period of time;

cake compression by diaphragm under compressed-air pressure, yielding a dryness identical to or greater than that obtained by high-pressure filtration, within a much shorter period of time and at a lower pressure, whence an increase in filter efficiency;

reduction of duty pressures, whence reduction of stresses to be withstood and of filter cost;

possibility of cake washing in order to displace the remnants of the liquid being filtered, replacing it with water or another liquid;

possibility of cake drying using gas (air, for example), to further increase its dryness;

possibility of obtaining equal or better results using a lower duty pressure, leading to a decrease in stresses, filter weight and cost;

simplification of the device:

(a) increased filtering surface for a device with unchanged dimensions;

(b) elimination of filter compartments;

(c) elimination of inflatable bladders behind each compartment;

(d) possible reduction of the number of feed valves for charged liquid (only one cavity to be fed).

In the variant of FIG. 6, virtually all of the above-mentioned advantages are obtained with a construction which, as in the preceding technical solutions, includes segment-shaped compartments 61 whose inner surface is provided with grooves 62, thereby forming a chain. Each segment 61 is covered by a filter cloth 63 and presents an edge seal formed by an attached inflatable ring 64. The back of the segment is attached to centrifugal return springs 65, retained against supports 66.

Facing these multiple chained segments is a drum 67, analogous to drum 30 and also provided with peripheral grooves 69 covered by a filter cloth 68 integral with said drum 67. This filter cloth covers the openings 70 of valve-equipped feed tubes 71.

In contrast, a filter cloth 73, identical to the above-mentioned filter cloth 51 insofar as path and accessories are concerned, is installed facing grooves 62.

These groove systems 62 and 69 are connected to filtered-liquid drainage channels 74 and 75.

Each segment 61 is backed by a corresponding inflatable bladder 76 which pushes it toward the drum against the action of springs 65 in order to press-dry the filtrate cake as mentioned above.

The operation of this arrangement is identical to that described with regard to FIGS. 3 to 5. The difference between the two lies in the number of cakes formed during a filtering operation. This difference is also evident in the number of openings 70, feed tubes 71 and corresponding valves, which must be equal to that of segments 61, whereas only one of each of these items may be necessary with the solution of FIGS. 3 to 5.

I claim:

1. Filtration device including the combined assembly of a drum equipped with radial feed pipes for the charged liquid to be filtered, originating at a tight control valve on the drum's mounting shaft terminating at openings in the drum surface, in the proximity of which valves are installed; a filter cloth enveloping an initial segment of the drum and spaced from a second, complementary segment as it follows a looped path passing over countershafts; and a chain of compartmented elements surrounding at least said initial drum segment, which segment is also enveloped by means for tight application of said filter cloth and said compartmented elements against said drum, which means are placed in action during the intervals of open-valve admission of the charged liquid while the drum, chain and cloth are immobile, and released upon the closing of said valves while at least the drum and cloth are set in motion causing them to pass by at least a station for scraping off the solid residue of filtrate cake.

2. Device pursuant to claim 1, in which the chain of compartmented elements also separated from the periphery of the drum by a looped path, is also caused to advance along a different routing from that of the filter cloth within the said path.

3. Device pursuant to claim 1, in which the chain of compartmented elements is limited to radial motion at the said initial segment, with each element offering only an individual capability of radial travel toward and away from said drum and its enveloping filter cloth.

4. Device pursuant to claim 3, in which each compartmented element is carried on elastic fasteners.

5. Device pursuant to claim 1, in which the filter-cloth loop passes by scraping and washing devices associated with at least one surface of said cloth, with the scraping devices sending detached solids to discharge components.

6. Device pursuant to claim 1, in which a scraping device is mounted on the surface of the second segment of the drum and guides detached solids to discharge components.

7. Device pursuant to claim 1, in which the valves are mounted as close as possible to the openings of said radial pipes in the lateral surface of the drum.

8. Device pursuant to claim 1, in which the means for sealing the chain of compartmented elements and the filter cloth against the drum are formed by the combination of an external hoop, held in place around the initial segment by fixed fasteners, and an inflatable inner envelope between hoop and chain.

9. Device pursuant to clim 1, in which each compartment is provided with a grooved bottom for collection of the filtered liquid, passing through a corresponding filter cloth, and in which the corresponding surface of the drum is itself provided with grooves covered by a second filter cloth driven by said drum and traversed by the incoming charged liquid to be filtered.

10. Device pursuant to claim 9, in which each compartment is bordered by an inflatable sealing ring.

11. Device pursuant to claim 9, in which the set of compartments forms a chain surrounding the drum's initial active filtering segment, with each chain element having its individual sealing ring and centrifugal return components, while backed by an inflatable bladder inserted inside an outer supporting hoop.

12. Device pursuant to claim 9, in which the internally-channeled compartmented chain is formed by bands of a flexible, elastic material with smooth framing strips, with at least one of such bands surrounding the drum and in turn covered by a second band, each of the two bands being associated with a corresponding filter cloth.

13. Device pursuant to claim 12, in which the outer band is formed by a pair of bands, the inner band being grooved on one surface and the outer band having two smooth surfaces, with orifices for inflation of the space between said bands for cake drying.

14. Device pursuant to claim 12, in which an associated inflatable sealing ring creates a single filtering compartment.

15. Device pursuant to claim 12, in which one of the bands is provided with lateral reinforcements for attachment of elastic centrifugal-return elements.

16. Device pursuant to claim 9, including orifices for admission of cake washing liquid and drying gas between the filter cloths.

* * * * *